(No Model.)
J. B. ENTZ.
ELECTRIC RAILWAY.
No. 448,328.
Patented Mar. 17, 1891.
10 Sheets—Sheet 1.
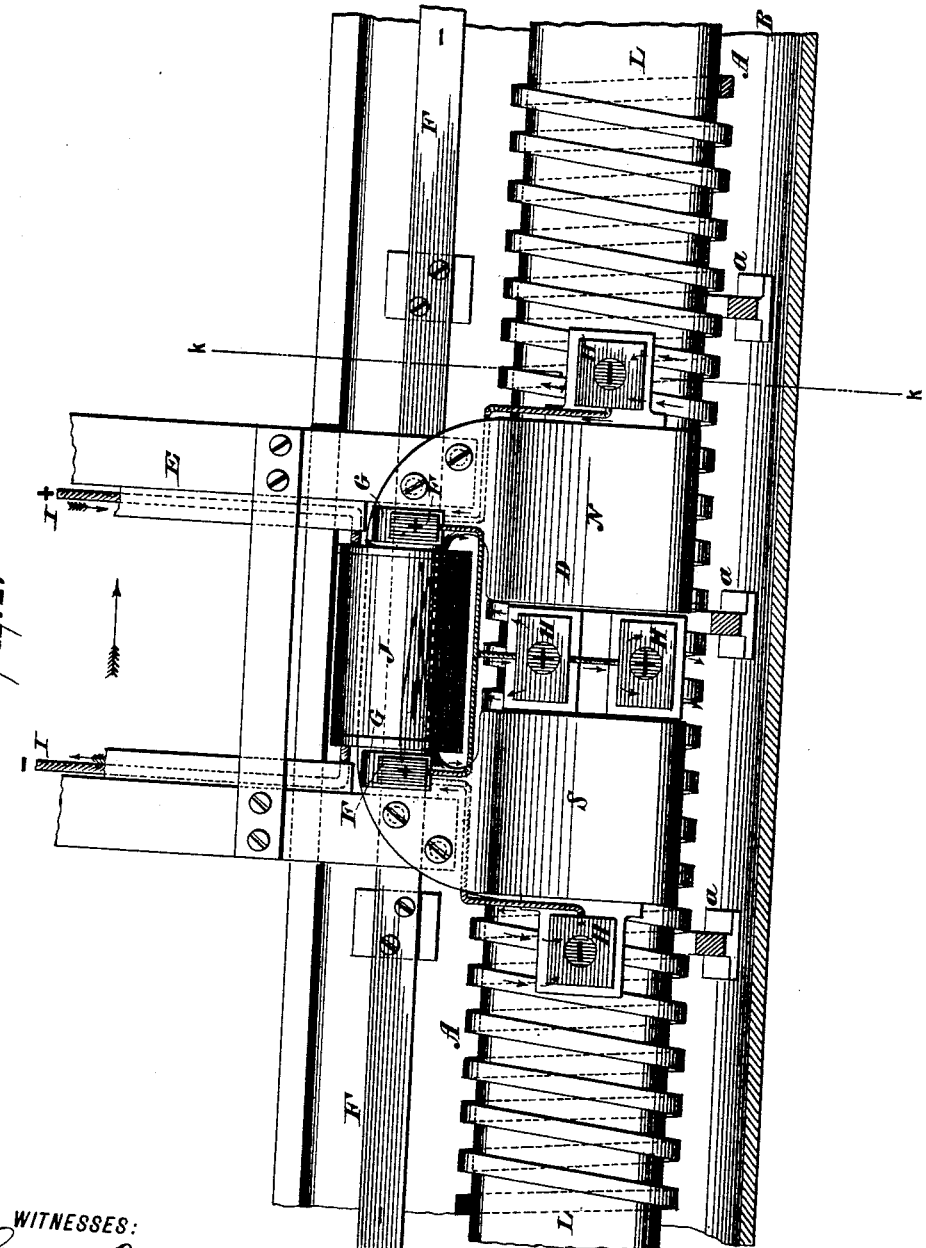
WITNESSES:
Gustave Dieterich.
William Goebel.
INVENTOR
Justus B. Entz
BY
his ATTORNEYS

(No Model.)  10 Sheets—Sheet 2.
J. B. ENTZ.
ELECTRIC RAILWAY.
No. 448,328. Patented Mar. 17, 1891.
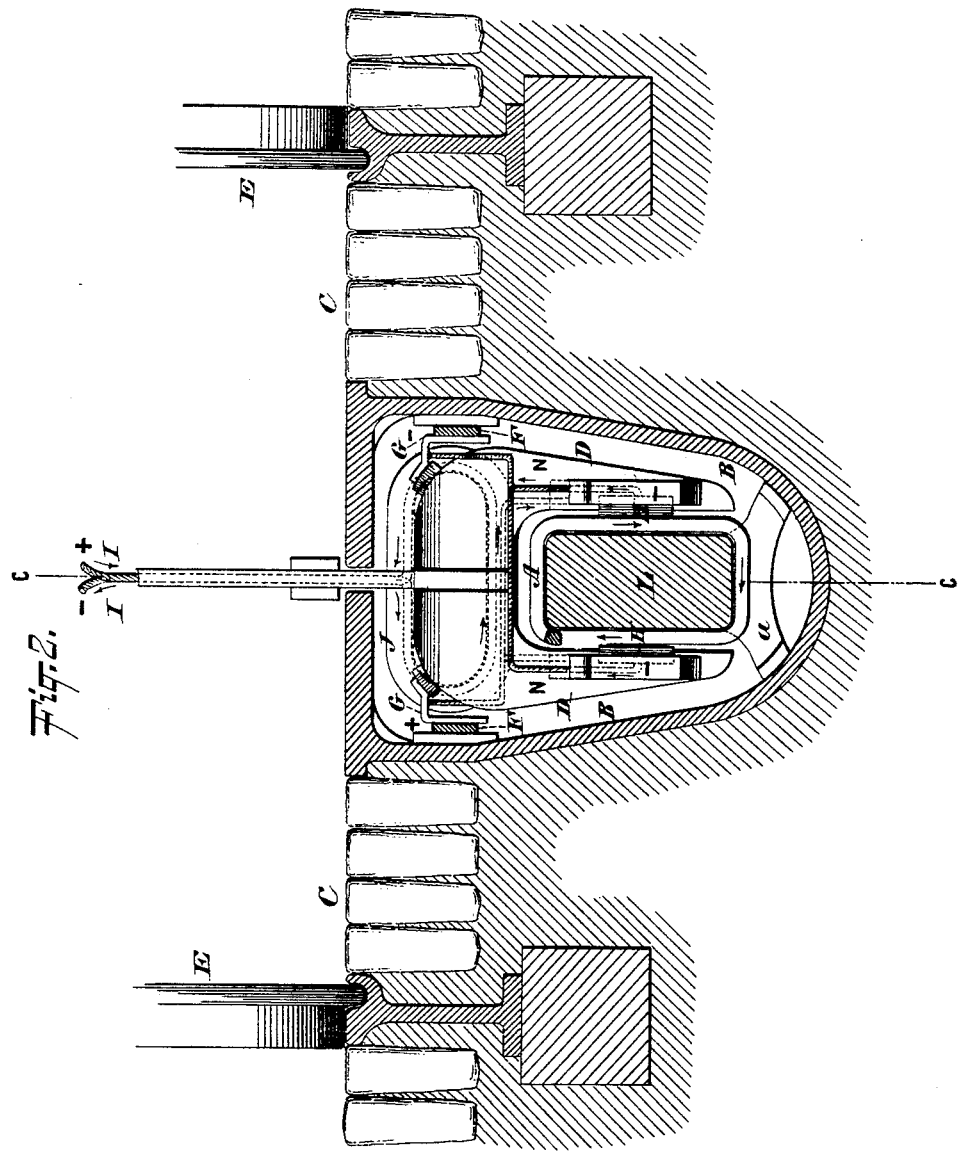
WITNESSES:
Gustav Dieterich
William Goebel
INVENTOR
Justus B Entz
BY
Briesen & Knauth
his ATTORNEYS.

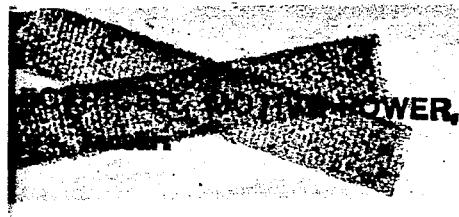
(No Model.) 10 Sheets—Sheet 3.
J. B. ENTZ.
ELECTRIC RAILWAY.
No. 448,328. Patented Mar. 17, 1891.
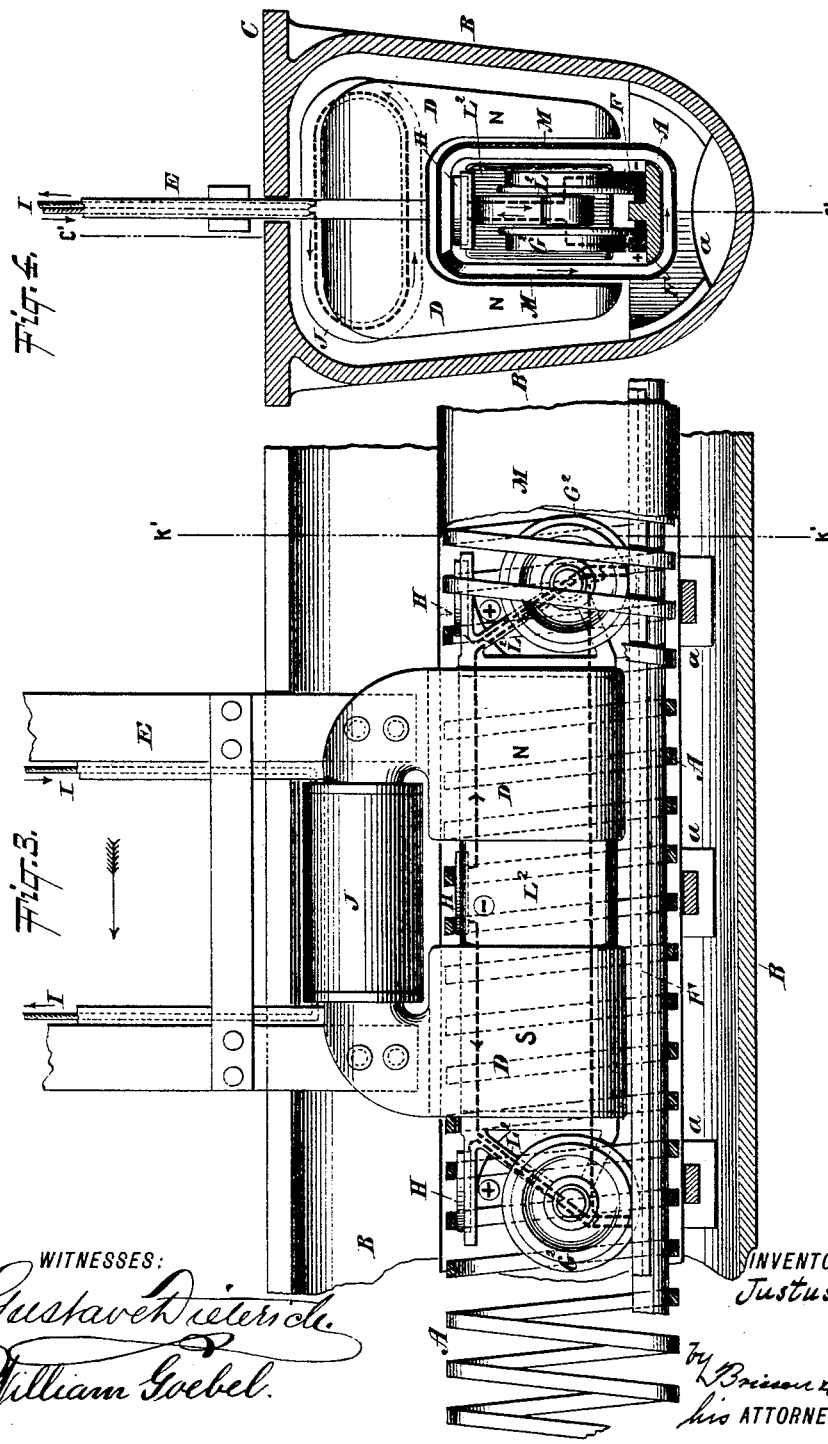
WITNESSES:
Gustave Dieterich.
William Goebel.
INVENTOR
Justus B Entz
by Briesen & Knauth
his ATTORNEYS.

(No Model.)
J. B. ENTZ.
ELECTRIC RAILWAY.
No. 448,328.
10 Sheets—Sheet 4.
Patented Mar. 17, 1891.
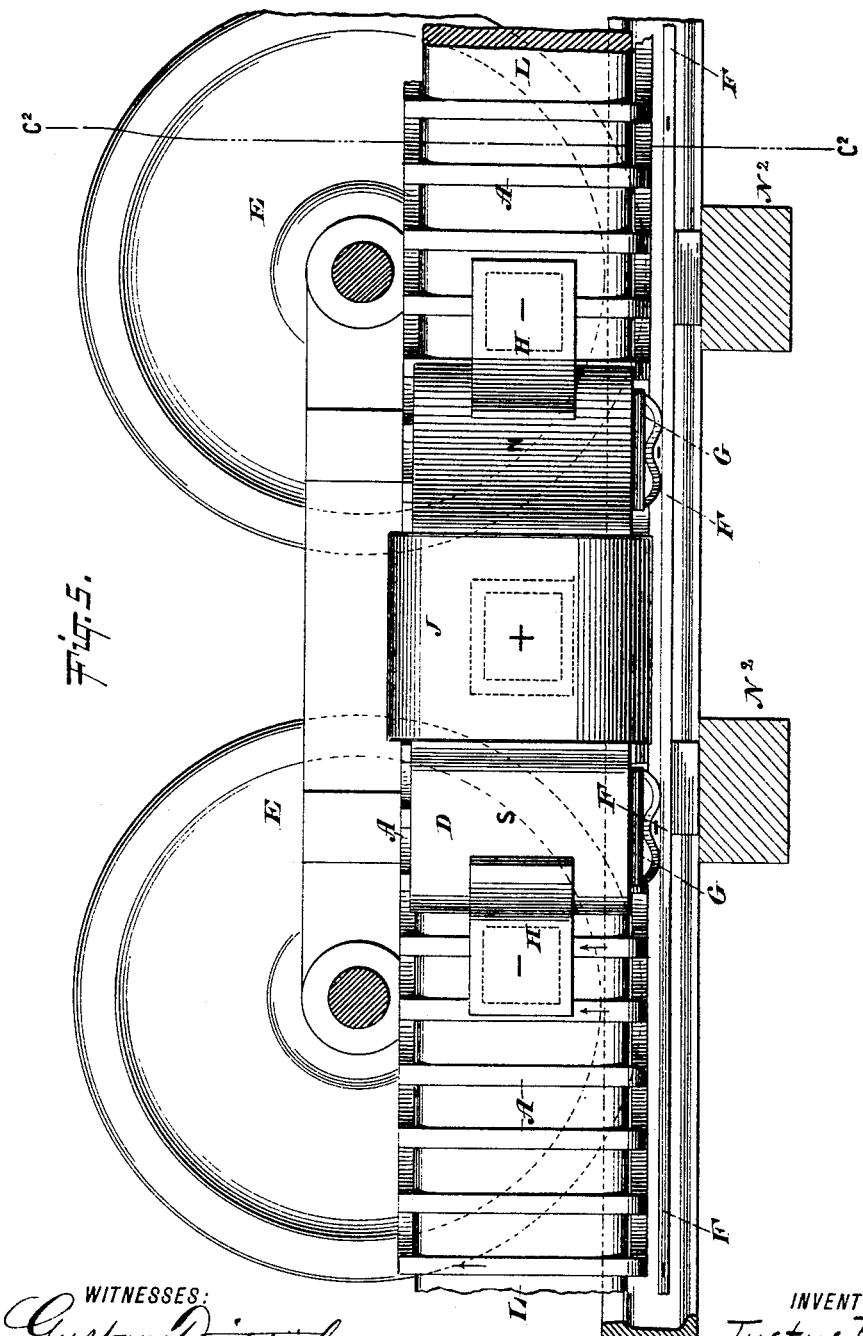
WITNESSES:
Gustave Dieterich.
William Goebel.
INVENTOR
Justus B. Entz
BY
Briesen & Knauth
his ATTORNEYS.

(No Model.) 10 Sheets—Sheet 5.
J. B. ENTZ.
ELECTRIC RAILWAY.
No. 448,328. Patented Mar. 17, 1891.
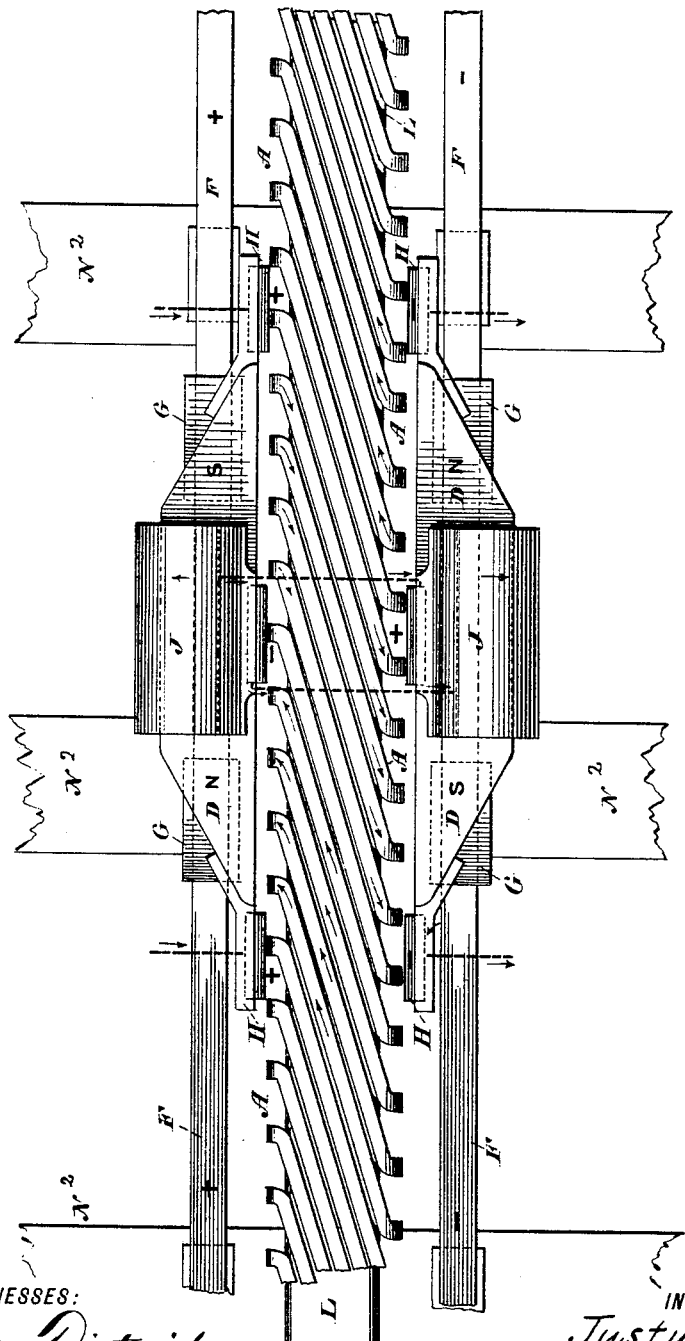
WITNESSES:
INVENTOR
Justus B Entz
BY
his ATTORNEYS.

(No Model.) 10 Sheets—Sheet 6.
J. B. ENTZ.
ELECTRIC RAILWAY.
No. 448,328. Patented Mar. 17, 1891.
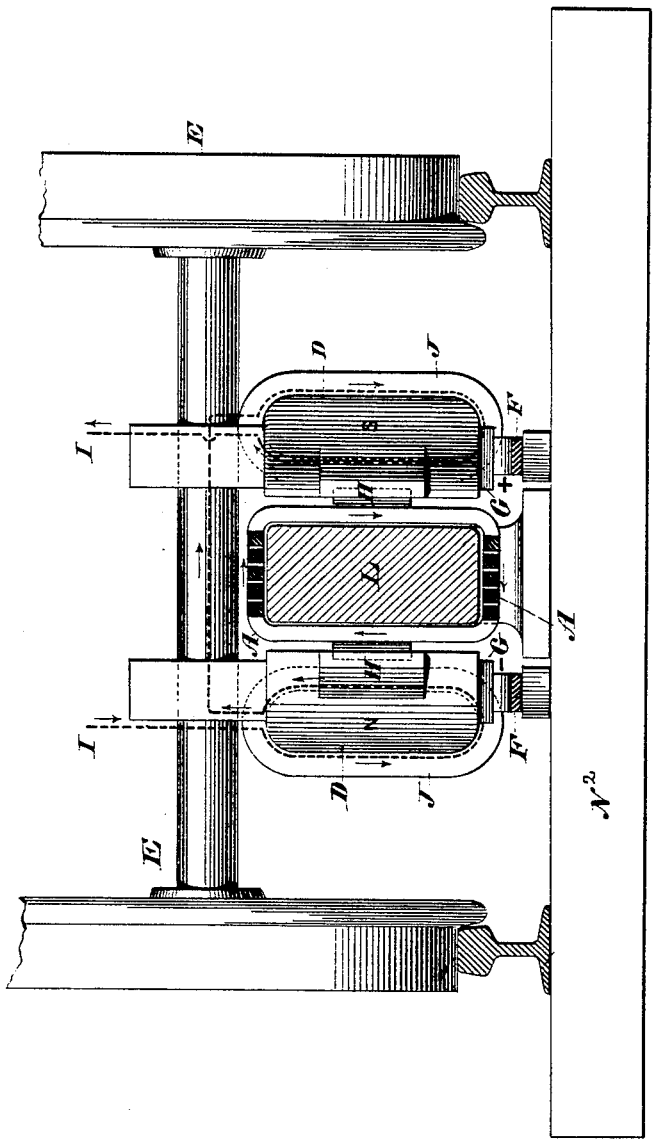
WITNESSES: INVENTOR
Gustav Dieterich. Justus B. Entz
William Goebel. BY
Briesen & Knauth
his ATTORNEYS.

(No Model.)

J. B. ENTZ.
ELECTRIC RAILWAY.

No. 448,328.     Patented Mar. 17, 1891.

10 Sheets—Sheet 7.

WITNESSES:
Gustave Dieterich.
William Goebel.

INVENTOR
Justus B Entz
BY
Briesen & Knauth
His ATTORNEYS.

(No Model.) 10 Sheets—Sheet 8.

J. B. ENTZ.
ELECTRIC RAILWAY.

No. 448,328. Patented Mar. 17, 1891.

WITNESSES:
Gustave Dieterich.
William Goebel.

INVENTOR
Justus B. Entz
BY
His ATTORNEYS.

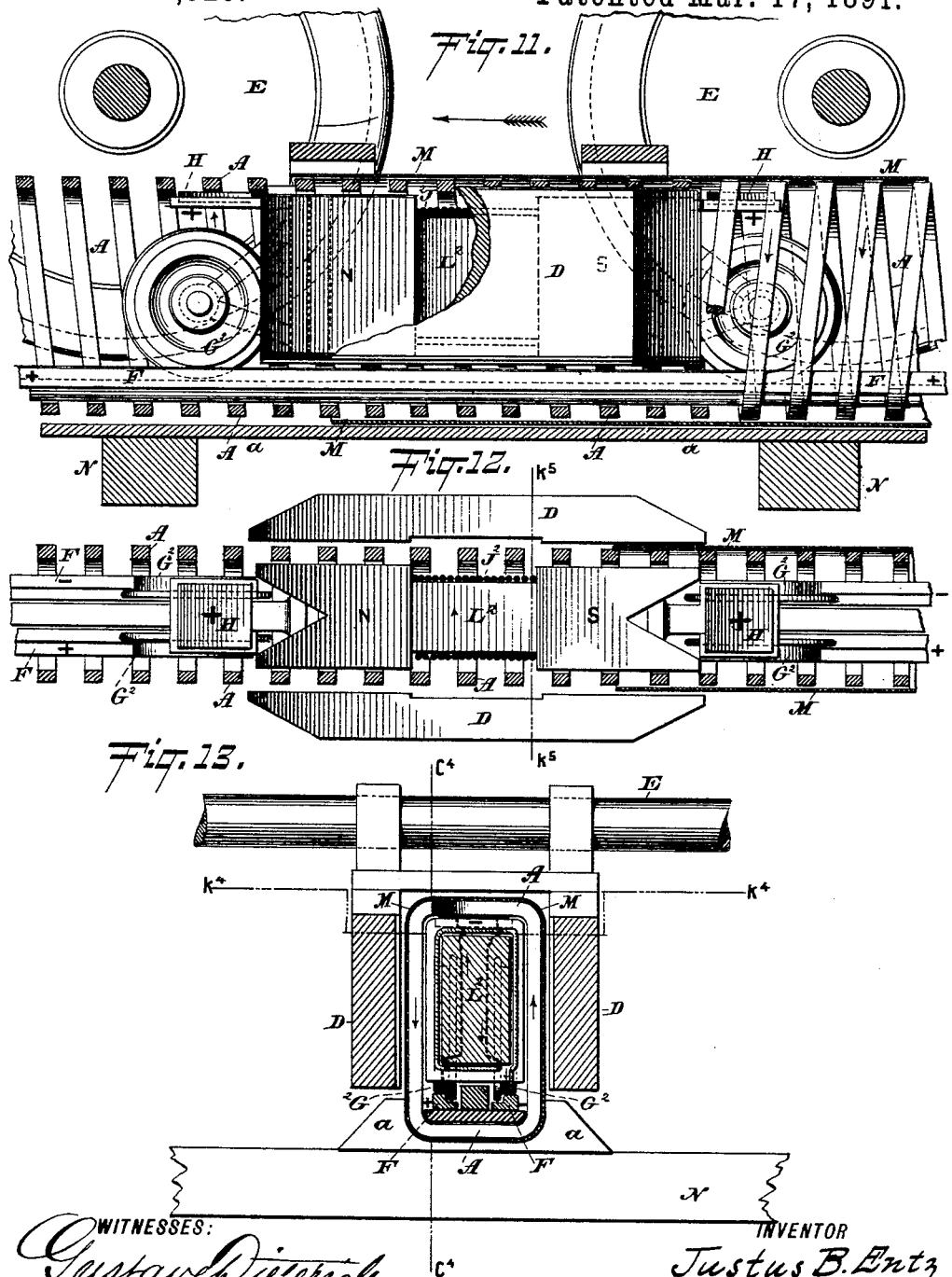

(No Model.)  
J. B. ENTZ.  
ELECTRIC RAILWAY.  
No. 448,328. Patented Mar. 17, 1891.
10 Sheets—Sheet 10.
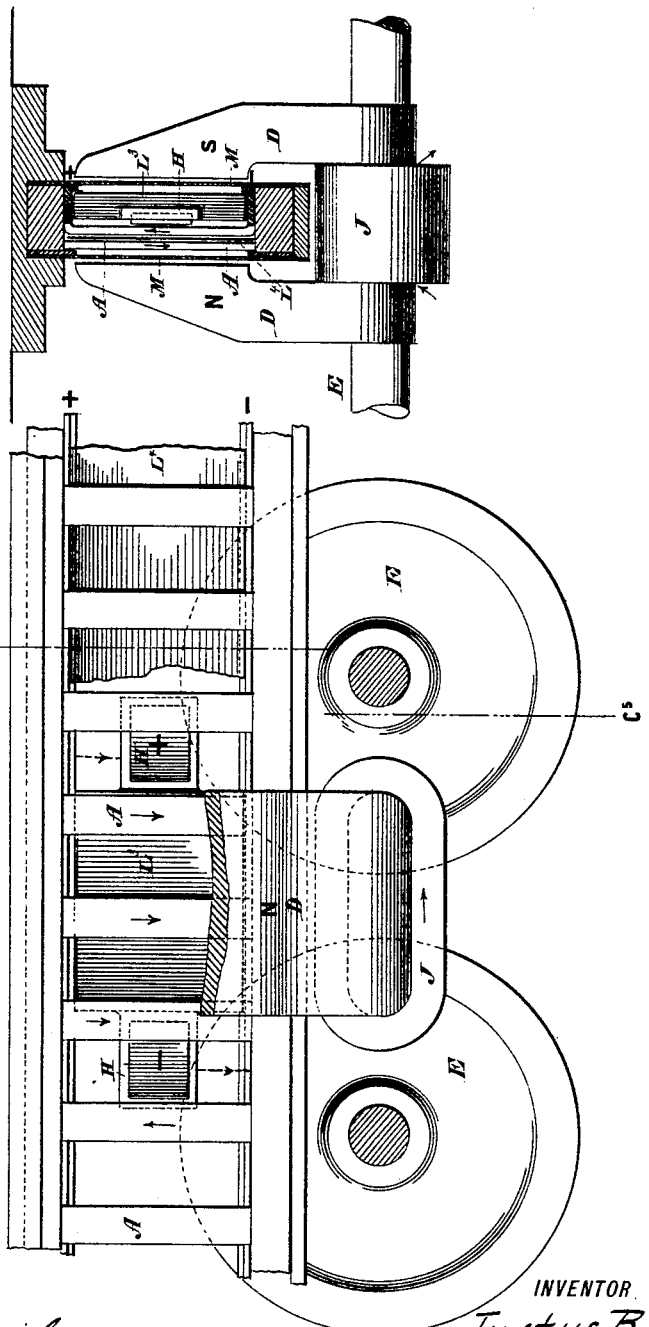
WITNESSES:  
Gustave Dieterich.  
William Goebel
INVENTOR  
Justus B. Entz  
BY  
His ATTORNEYS,

UNITED STATES PATENT OFFICE.

JUSTUS B. ENTZ, OF NEW YORK, N. Y., ASSIGNOR TO THE WADDELL-ENTZ ELECTRIC COMPANY, OF SAME PLACE.

ELECTRIC RAILWAY.

SPECIFICATION forming part of Letters Patent No. 448,328, dated March 17, 1891.

Application filed July 3, 1890. Serial No. 357,658. (No model.)

*To all whom it may concern:*

Be it known that I, JUSTUS B. ENTZ, a resident of the city, county, and State of New York, have invented an Improvement in Electric Railways, of which the following is a specification, reference being had to the accompanying drawings, forming part thereof, wherein—

Figure 8:
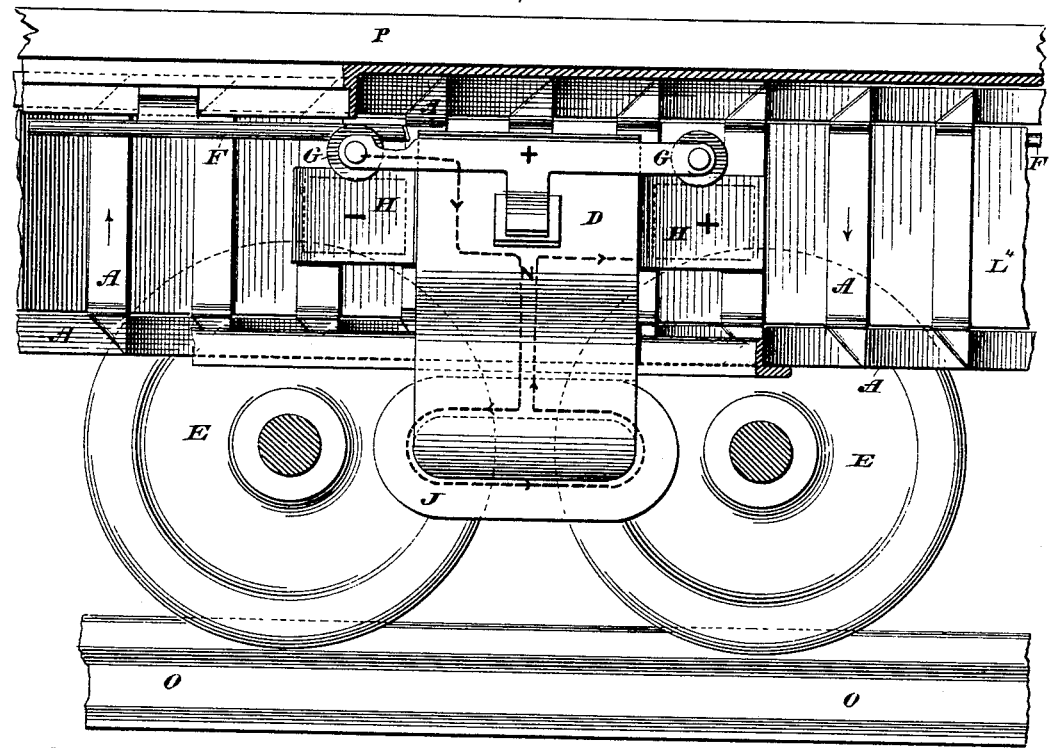

Figure 1 represents a side view of the mechanism used in my electric railway within a conduit, the said conduit being represented in longitudinal section. Fig. 2 is a cross-section on the line $k\,k$, Fig. 1. Fig. 3 is a side view, similar to Fig. 1, of a modification of the invention, Fig. 4 being a cross-section on the line $k'\,k'$, Fig. 3. Fig. 5 is a side view of another modification of the invention; Fig. 6, a top view of the same; Fig. 7, a cross-section on the line $c^2\,c^2$, Fig. 5. Fig. 8 is a side view, partly in section, of another modification of said invention, and Fig. 9 a top view thereof. Fig. 10 is a cross-section on the line $k^3\,k^3$, Fig. 9. Fig. 11 is a side view, partly in section, of still another modification of said invention; Fig. 12, a horizontal section on the line $k^4\,k^4$, Fig. 13, and Fig. 13 a cross-section on the line $k^5\,k^5$, Fig. 12. Fig. 14 is a side view, partly broken away, of another modification of the invention, and Fig. 15 a cross-section on the line $c^5\,c^5$, Fig. 14.

The letters N and S in the drawings indicate north and south poles.

This invention relates to a new electric system of transportation—in other words, to a new mechanism for propelling vehicles with the aid of electricity; and it consists, mainly, in the employment in such a system of a continuous armature, which armature is stationary, and which extends from end to end of the track to be traversed by the vehicle. The armature exercises its force upon a field-magnet, which is carried by the vehicle to be propelled, with the aid of brushes or analogous contact devices that also travel at the same rate as the vehicle, and that convey the current from mains or conductors which are laid along the route to that portion of the armature which is under the influence of the field-magnet.

This system has many advantages over the devices heretofore employed for utilizing electric currents in the propulsion of vehicles, one advantage which may here be mentioned being that the power applied is in the nature of a direct pull and does not depend upon the weight of the car for its traction power.

Another advantage, which is very important, is that the armature-winding can be regulated to suit the traffic as regards speed and power along different parts of the same route. Thus on a grade ascent the windings may be made closer together than on a level, thereby giving greater power when the same is needed, and giving a greater average efficiency by adapting the winding to the work to be done.

All conductors carrying dangerous currents can be completely sealed in conduits which admit of no mechanical or electrical communication between said conductors and the street or vehicle. This idea of sealing the conductors also prevents danger of leakage, due to moisture or otherwise, and allows of the use of higher potentials than would otherwise be possible, and consequently induces higher efficiency.

My system is capable of propelling a car over the same track in either direction, of changing the speed to any desired rate, and obviates, therefore, the objections that can be urged against the cable system of propulsion.

Referring now to one form in which my invention may be employed, which is represented in Figs. 1 and 2 of the drawings, the letter A there shows the armature placed in a conduit B, below the level of the street C. The armature is a continuous coil extending from end to end of the track.

D is the field-magnet, which is suspended within the conduit B from the vehicle E, and which embraces the armature A, as appears clearly from Fig. 2.

F F are the mains or conductors, which are secured within the conduit B and extend from end to end of the road.

G G are contact-pieces carried by the magnet D and bearing against the mains or conductors F F.

H H are the brushes, which are carried by the field-magnet D and bear upon the outside of the coiled armature A. The magnet D is excited with the aid of conductors I I, that lead from the car or vehicle E to and around the spool J of the magnet D. The winding of the armature A is that of a continuous coil upon an iron core, and corresponds to a Gramme ring armature cut at one place and laid out straight. The field-magnet D has a single coil on its spool J, and its pole-pieces from either end extend down and embrace the top and sides of the armature A, the poles being of opposite polarity, as indicated by the letters N S, it being necessary that the current should flow in opposite directions in that portion of the armature which is inclosed by each set of pole-pieces. To this end the brushes are placed and connected as shown, a brush of one sign (say +) being between two poles and between two brushes of the opposite sign, (say −,) of which there is one at each end of the magnet. With the brushes connected in this way the current will enter at the middle + brush, divide and flow in opposite directions under the opposite poles to the outside brushes. The effect of the current flowing in the armature upon the field-magnet is to cause the one which is capable of moving to move in relation to the other, and as in this instance the armature-winding is fixed the magnet will tend to move and will carry with it the vehicle to which it is secured, and as the current in the armature-coil A is kept continually beneath the magnet by means of the traveling brushes the movement will be continuous and this movement will be in either direction at will, according to the direction of the current in the winding and the polarity of the magnet. Changing either and keeping the other the same will reverse the direction of motion. The drawings represent at $a$ brackets by which the armature-coil A is stationarily supported within the conduit.

L is an iron core placed within the tubular armature A and of the same length as said armature. Its cross-section is clearly represented in Fig. 2.

In Figs. 3 and 4 the parts as represented in Figs. 1 and 2 are substantially duplicated, with the exception that instead of the continuous core L a traveling core $L^2$ is represented, this traveling core being only about as long as the field-magnet D, and in fact of sufficient length only to complete the magnetic circuit between the two magnet-poles. This core $L^2$ always moves with the magnet D by reason of the magnetic attraction between them and carries the brushes H for contact with the armature and the contact-pieces for contact with the mains or conductors F, which in this case are placed inside the armature-coil. In this form the wheels $G^2$ of the traveling core, which wheels rest on the mains F F, serve as contact-pieces or current-collectors, the said wheels $G^2$ being insulated from the frame that carries them at the hub. As in this case there is no mechanical or electrical connection between the magnet D and the armature A, I am able to completely seal the armature in an air and water tight casing M, the advantages of which have already been hereinabove referred to, in that it prevents all leakage from the mains and all interference by moisture, dust, or other foreign matter, which in other structures would be liable to come into contact with the mains or with the parts that distribute the current therefrom. Inasmuch as this short traveling core enables me to employ this casing M, I prefer the form represented in Figs. 3 and 4 as the best form in which my invention may be clothed.

In Figs. 5, 6, and 7 a modification is shown which represents the continuous armature A as placed on ties $N^2$ on the same level as the road-bed and the mains or conductors F laid between the rails near to the armature A. The winding of the armature A, as intended to be represented in Fig. 6, produces a continuous coil which incloses the stationary long core L the same as in Figs. 1 and 2; but the coil A is wound diagonally on the core so that the sides of one turn are not opposite one another, but at such a distance from one another as equals the distance between the brushes of opposite signs. With this method of winding the current flowing on opposite sides of the armature is always in the same direction instead of in opposite directions, as in Figs. 1 and 2. The object of this winding is to have the lines of magnetic force traverse the winding at right angles to the core instead of traveling through it from end to end. This allows me to reduce the width or thickness of the core, which may with this winding be still further reduced, as shown in Figs. 8, 9, and 10, where the two sides are only separated by an insulating-plate $L^4$ and no core proper is used.

Referring once more to Figs. 5, 6, and 7, the magnetic field is shown produced by two magnets D with opposite poles facing each other, so that the magnetic circuit is through the core and pole-pieces of one magnet across the winding to the pole-piece of the other magnet on the opposite side through the second magnetic core and pole-piece, and across the armature again to the pole-piece of the first magnet. The brushes H are shown fastened to the magnets D on both sides of the armature A, opposite brushes being of opposite signs, the contact-pieces G being also carried by the magnets, as shown.

Figure 9:
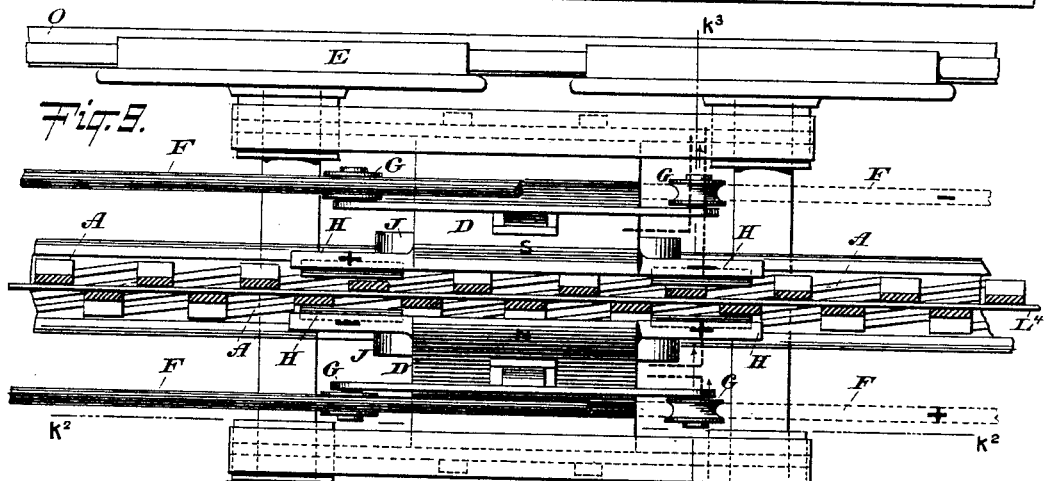
Figure 10:
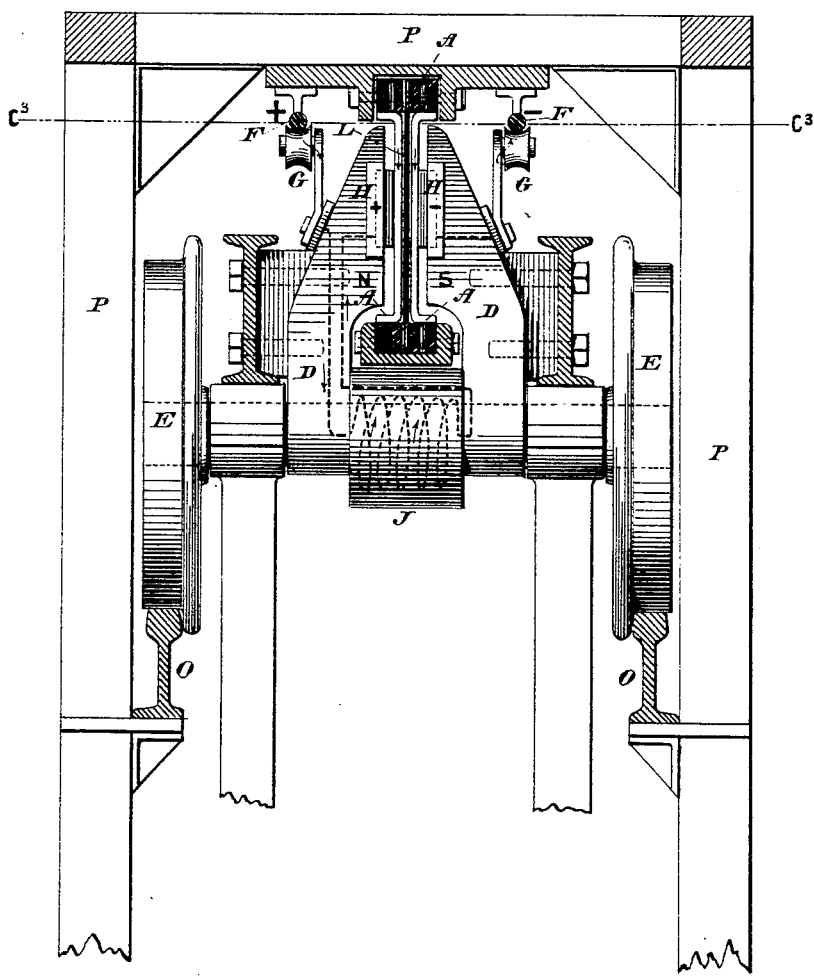

In Figs. 8, 9, and 10 is shown the closely-wound armature-coil A in connection with an elevated structure, with a vehicle running on a raised track O. In this case there is but one field-magnet D, having a spool J, and carrying the brushes H and the contact pieces G. The armature A is secured to the framing P of the elevated structure.

In Figs. 11, 12, and 13 a modification is shown of the structure represented in Figs. 3 and 4, which modification consists in winding the inner traveling core $L^2$ with a magnetizing-coil $J^2$, so that the inner traveling core $L^2$ becomes the magnet, while the outside magnet D performs the function merely of the core in the former structure for the purpose of completing the magnetic circuit, motion being imparted to it by the attraction between it and the core. The brushes are carried on the inner side of the armatures as before—that is, as in Figs. 3 and 4. This arrangement also allows the armature to be surrounded by the casing M. (Shown in Figs. 11 and 12.)

In Figs. 14 and 15 is represented a modification of the device shown in Figs. 8, 9, and 10, in which there is the flatly-wound core A, which may be sealed in a casing, and alongside of which a short traveling core $L^3$, carrying the brushes H, is used. This core $L^3$ may be inclosed in the casing M and included in the magnetic circuit, so that it will move with the magnet D outside.

The system may be further modified in many instances; but I have given the salient features of it, which, briefly stated, lie in the employment of the continuous armature combined with a traveling magnet and with the other elements that are in the following claims more fully specified.

What I claim, and desire to secure by Letters Patent, is—

1. In an electric system of transportation, the stationary armature A, combined with the movable magnet D and with the vehicle E, to which said magnet D is connected, all so arranged as to permit said vehicle to travel along said armature.

2. The stationary armature A, combined with the field-magnet D and with the vehicle E, which carries said field-magnet, and with proper brushes or contact-pieces and stationary conductors F, all arranged to permit said vehicle to travel along the said armature, as specified.

3. The stationary continuous coiled armature A, combined with the inclosing conduit B, with the field-magnet D, mains or conductors F, and proper contact-pieces for contacting with the armature A and with the mains F, and being attached to the vehicle E, substantially as and for the purpose herein shown and described.

4. The vehicle E, carrying conductors I and carrying likewise the field-magnet D, having the spool J and contact-pieces, in combination with the mains or conductors F and stationary armature A, substantially as herein shown and described.

5. The vehicle E, carrying conductors I and carrying likewise the field-magnet D, having the spool J and contact-pieces G and H, in combination with the mains or conductors F, stationary armature A, and with the conduit B, substantially as herein shown and described.

6. In an electric system of transportation, the stationary armature A, combined with the movable magnet D, with a source of electric current, with a magnetic core for said armature, and with the vehicle E, substantially as shown and described.

7. The vehicle E, carrying conductors I and carrying likewise the field-magnet D, having the spool J and contact-pieces G H, in combination with the mains or conductors F and stationary armature A and with an inner core contained within the armature, substantially as herein shown and described.

8. The vehicle E, carrying conductors I and carrying likewise the field-magnet D, having the spool J and contact-pieces G H, in combination with the mains or conductors F and stationary armature A, with an inner core contained within the armature, and with the conduit B, substantially as herein shown and described.

9. The combination of the stationary continuous armature A with the traveling magnet D, carried by the vehicle E, and with the inner traveling core $L^2$ and mains or conductors F F, placed within the armature A, substantially as described.

10. The combination of the hollow continuous stationary armature A with the exterior magnet D, connected with the vehicle E and adapted to be excited from said vehicle, and with the inner traveling core $L^2$, carrying brushes H, and the contact-pieces $G^2$, and with conductors or mains F, contained within the armature A, substantially as herein shown and described.

11. The hollow continuous armature A, combined with the magnet D, carried by the vehicle E, and with the casing M, placed around said continuous armature A, substantially as herein shown and described.

12. The hollow continuous armature A, combined with the magnet D, carried by the vehicle E and adapted to be excited thereby, with the casing M, placed around said continuous armature A, and with the traveling core $L^2$, carrying brushes H and contact-pieces $G^2$, and with the conductors F F, substantially as herein shown and described.

JUSTUS B. ENTZ.

Witnesses:
MONTGOMERY WADDELL,
N. A. PHILLIPS.